(12) United States Patent
Propheter-Hinckley

(10) Patent No.: US 12,468,869 B2
(45) Date of Patent: Nov. 11, 2025

(54) INSPECTION SYSTEMS AND METHODS WITH AIRFOIL SHEATHS

(71) Applicant: RAYTHEON TECHNOLOGIES CORPORATION, Farmington, CT (US)

(72) Inventor: Tracy A. Propheter-Hinckley, Rocky Hill, CT (US)

(73) Assignee: RTX CORPORATION, Farmington, CT (US)

( * ) Notice: Subject to any disclaimer, the term of this patent is extended or adjusted under 35 U.S.C. 154(b) by 725 days.

(21) Appl. No.: 17/702,519

(22) Filed: Mar. 23, 2022

(65) Prior Publication Data

US 2023/0306163 A1 Sep. 28, 2023

(51) Int. Cl.
| | |
|---|---|
| *G06F 7/48* | (2006.01) |
| *B23P 15/02* | (2006.01) |
| *F01D 5/30* | (2006.01) |
| *G06F 30/25* | (2020.01) |
| *G06T 7/00* | (2017.01) |
| *G06F 119/02* | (2020.01) |

(52) U.S. Cl.
CPC .............. *G06F 30/25* (2020.01); *B23P 15/02* (2013.01); *F01D 5/30* (2013.01); *G06T 7/0006* (2013.01); *G06F 2119/02* (2020.01); *G06T 2207/10028* (2013.01)

(58) Field of Classification Search
CPC ........ B23P 15/02; B25J 9/1679; B25J 9/1684; F01D 21/003; F01D 25/285; F01D 5/005; F01D 5/30; F01D 5/34; F05B 2250/21; F05D 2230/72; F05D 2230/80; F05D 2240/305; F05D 2240/306; F05D 2260/83; F05D 2270/8041; G01B 11/002; G01B 3/14; G05B 2219/37449; G05B 2219/45066; G06F 2119/02; G06F 30/25; G06T 2207/10028; G06T 7/0006
See application file for complete search history.

(56) References Cited

U.S. PATENT DOCUMENTS

| | | | |
|---|---|---|---|
| 5,822,841 A | 10/1998 | Bales et al. | |
| 6,748,112 B1* | 6/2004 | Nguyen | G06T 3/073 |
| | | | 382/209 |
| 6,994,000 B2 | 2/2006 | Louthan et al. | |
| 8,434,224 B2 | 5/2013 | Berlanger et al. | |

(Continued)

FOREIGN PATENT DOCUMENTS

| | | |
|---|---|---|
| EP | 3182102 | 6/2017 |
| FR | 2987296 | 8/2013 |

OTHER PUBLICATIONS

European Patent Office, European Search Report dated Dec. 8, 2023 in Application No. 23158302.2.

(Continued)

*Primary Examiner* — Nithya J. Moll
(74) *Attorney, Agent, or Firm* — SNELL & WILMER L.L.P.

(57) ABSTRACT

A method is disclosed herein. In various embodiments, the method comprises: coupling a sheath to an airfoil of an integrally bladed rotor, the sheath comprising a plurality of apertures disposed therein; and coupling a plurality of locators to the integrally bladed rotor, each locator in the plurality of locators disposed through a corresponding aperture in the plurality of apertures.

13 Claims, 13 Drawing Sheets

(56) References Cited

U.S. PATENT DOCUMENTS

| | | |
|---|---|---|
| 8,464,425 B2 | 6/2013 | Berlanger et al. |
| 8,505,202 B2 | 8/2013 | Berlanger et al. |
| 2003/0112447 A1* | 6/2003 | Harding ............. G01N 21/8806 356/603 |
| 2005/0201611 A1* | 9/2005 | Lloyd, Jr. ............... F01D 5/141 382/152 |
| 2005/0217131 A1 | 10/2005 | Varsell et al. |
| 2007/0107180 A1* | 5/2007 | Mentz ................ G05B 19/4184 29/407.05 |
| 2013/0167392 A1 | 7/2013 | Boyer et al. |

OTHER PUBLICATIONS

European Patent Office, European Partial Search Report dated Jul. 21, 2023 in Application No. 23158302.2.

\* cited by examiner

INSPECTION SYSTEMS AND METHODS WITH AIRFOIL SHEATHS

FIELD

The present disclosure relates to inspection of a bladed rotor, and more specifically to preparation and inspection methods and systems for a bladed rotor of a gas turbine engine.

BACKGROUND

Gas turbine engines (such as those used in electrical power generation or used in modern aircraft) typically include a compressor, a combustor section, and a turbine. The compressor and the turbine typically include a series of alternating rotors and stators. A rotor generally comprises a rotor disk and a plurality of blades. The rotor may be an integrally bladed rotor ("IBR") or a mechanically bladed rotor.

The rotor disk and blades in the IBR are one piece (i.e., integral) with the blades spaced around the circumference of the rotor disk. Conventional IBRs may be formed using a variety of technical methods including integral casting, machining from a solid billet, or by welding or bonding the blades to the rotor disk. Inspection of IBRs may be difficult and often are performed manually or visually.

SUMMARY

A method is disclosed herein. In various embodiments, the method comprises: coupling a sheath to an airfoil of an integrally bladed rotor, the sheath comprising a plurality of apertures disposed therein; and coupling a plurality of locators to the integrally bladed rotor, each locator in the plurality of locators disposed through a corresponding aperture in the plurality of apertures.

In various embodiments, the method further comprises decoupling the sheath from the airfoil. The method may further comprise: recoupling the sheath to a second airfoil; and coupling a second plurality of locators to the second airfoil, each locator in the second plurality of locators disposed through the corresponding aperture in the plurality of apertures. The method may further comprise coupling a third plurality of locators to each airfoil of the integrally bladed rotor through the plurality of apertures of the sheath.

In various embodiments, the plurality of locators include at least three locators.

In various embodiments, ach locator in the plurality of locators may include a pyramid shape.

In various embodiments, each locator in the plurality of locators is aligned and placed via the corresponding aperture in the plurality of apertures.

In various embodiments, three locators in the plurality of locators are coupled to one of a pressure side and a suction side of the airfoil. Two of the plurality of locators may be coupled to an opposite side of the airfoil from the three locators. A sixth locator may be coupled to a platform of the integrally bladed rotor.

An article of manufacture is disclosed herein. The article of manufacture may include a tangible, non-transitory computer-readable storage medium having instructions stored thereon that, in response to execution by a processor, cause the processor to perform operations comprising: commanding, via the processor, a scanner to scan around a first airfoil of a bladed rotor; determining, via the processor, an apex of each locator in a plurality of locators associated with the first airfoil; and generating, via the processor, a first six point nest of the airfoil based on the apex of each locator in the plurality of locators.

In various embodiments, the operations further comprise generating, via the processor, a second six point nest of the airfoil based on the first six point nest. The second six point nest may include an origin corresponding to second origin of a product definition for a design of the bladed rotor being inspected. The plurality of locators may include at least three locators.

In various embodiments, the operations further comprise: commanding, via the processor, a motor to rotate a shaft coupled to the bladed rotor a fixed amount; commanding, via the processor, the scanner to scan around a second airfoil of the bladed rotor; determining, via the processor, a second apex of each locator in a second plurality of locators associated with the second airfoil; and generating, via the processor, a first six point nest of the second airfoil based on the second apex of each locator in the second plurality of locators. The operations may further comprise generating a second six point nest of the second airfoil based on the second apex of each locator in the second plurality of locators, the second six point nest of the second airfoil defining a second origin corresponding to a first origin of the second six point nest of the first airfoil.

A sheath is disclosed herein. The sheath may comprise: a first protrusion, a second protrusion and a third protrusion extending from a first surface, the first protrusion, the second protrusion, and the third protrusion configured to contact a pressure side or a suction side of an airfoil in response to coupling the sheath to the airfoil; a first edge roll and a second edge roll configured to contact a leading edge or a trailing edge of the airfoil in response to coupling the sheath to an airfoil; and a fourth protrusion configured to extend outward from the sheath and contact a platform of a rotor in response to couple the sheath to the airfoil.

In various embodiments, the sheath further comprises a plurality of apertures disposed in the sheath, each aperture in the plurality of apertures configured to align a locator on the platform of the rotor, the pressure side of the airfoil, or the suction side of the airfoil. Each aperture in the plurality of apertures may be disposed through an alignment protrusion extending from an external surface of the sheath.

In various embodiments, the sheath comprises a first half configured to couple to a second half, the first half comprising the first protrusion, the second protrusion and the third protrusion.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1A:
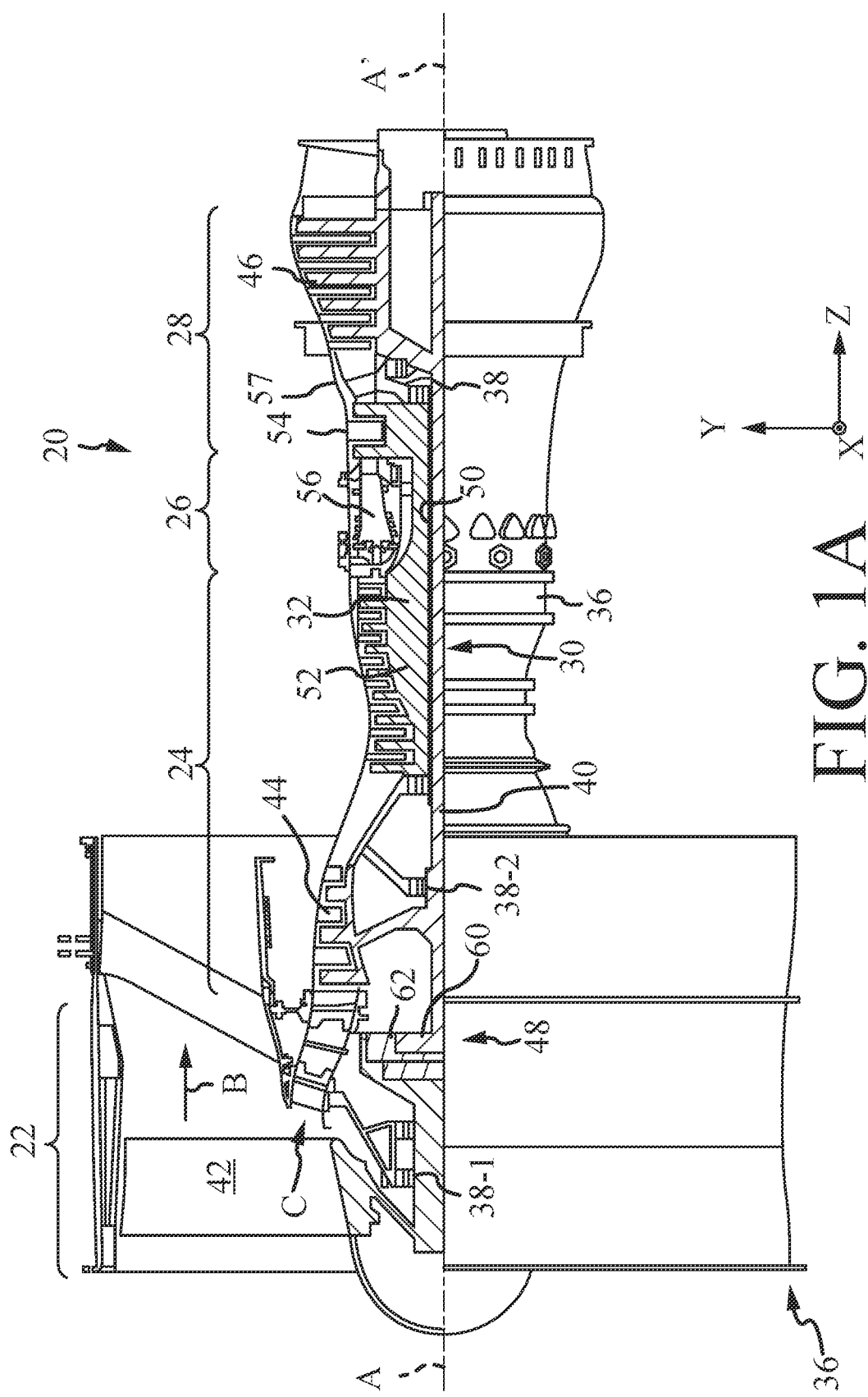
FIG. 1A illustrates a cross-sectional view of a gas-turbine engine, in accordance with various embodiments.

With reference to FIG. 1A, a gas turbine engine 20 is shown according to various embodiments. Gas turbine engine 20 may be a two-spool turbofan that generally incorporates a fan section 22, a compressor section 24, a combustor section 26 and a turbine section 28. In operation, fan section 22 can drive air along a path of bypass airflow B while compressor section 24 can drive air along a core flow path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures, single spool architecture or the like.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the Z direction on the provided X-Y-Z axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Figure 1B:
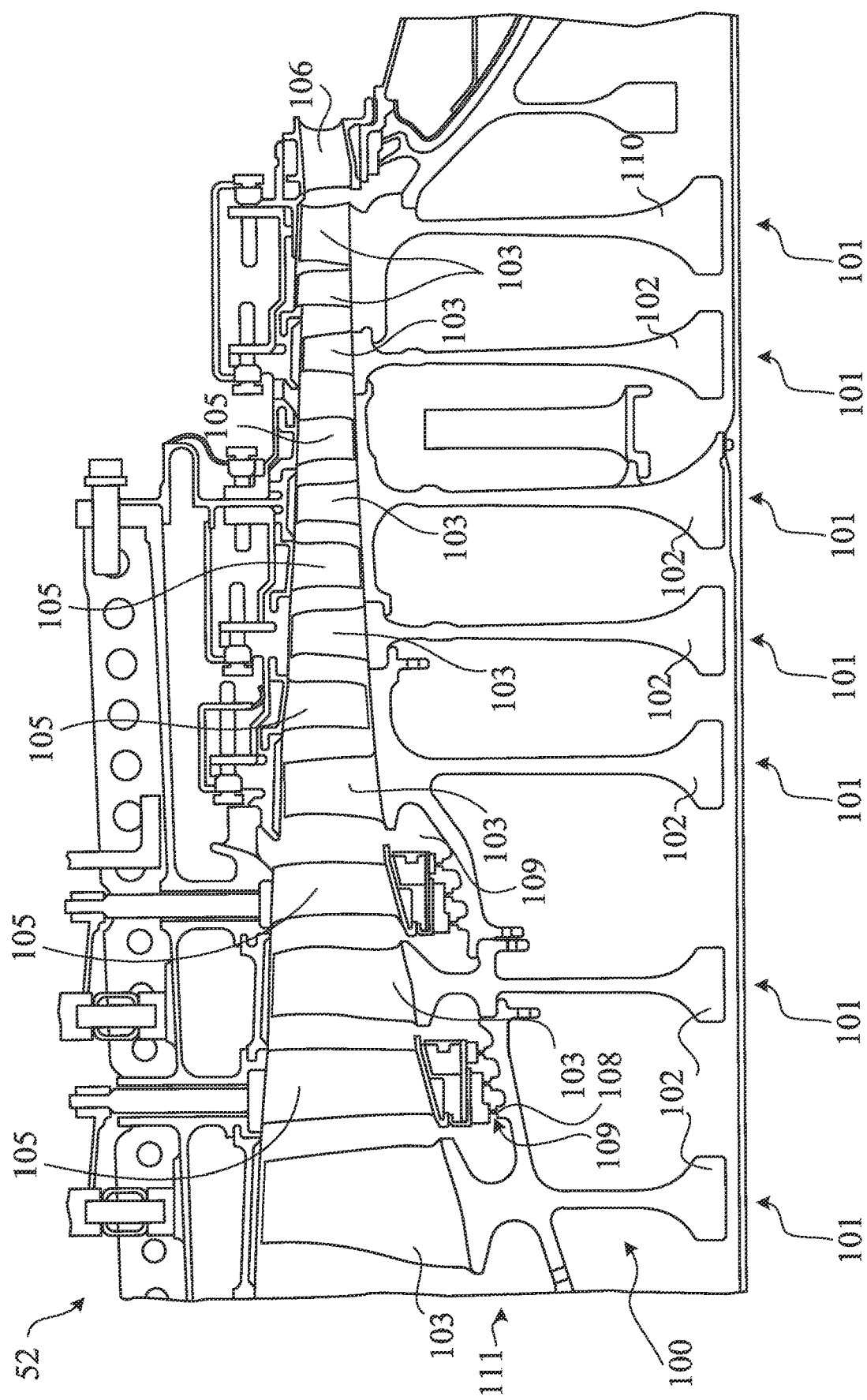
FIG. 1B illustrates a cross-sectional view of a high pressure compressor, in accordance with various embodiments.

In various embodiments, and with reference to FIG. 1B, high pressure compressor 52 of the compressor section 24 of gas turbine engine 20 is provided. The high pressure compressor 52 includes a plurality of blade stages 101 (i.e., rotor stages) and a plurality of vane stages 105 (i.e., stator stages). The blade stages 101 may each include an integrally bladed rotor ("IBR") 100, such that the blades 103 and rotor disks 102 are formed from a single integral component (i.e., a monolithic component formed of a single piece). The blades 103 extend radially outward from the rotor disk 102. The gas turbine engine 20 may further include an exit guide vane stage 106 that defines the aft end of the high pressure compressor 52. Although illustrated with respect to high pressure compressor 52, the present disclosure is not limited in this regard. For example, the low pressure compressor 44 may include a plurality of blade stages 101 and stator stages 105, each blade stage in the plurality of blade stages 101 including the IBR 100 and still be within the scope of this disclosure. In various embodiments, the plurality of blade stages 101 form a stack of IBRs 110, which define, at least partially, a rotor module 111 of the high pressure compressor 52 of the gas turbine engine 20.

In various embodiments, an IBR 100 disclosed herein may comprise a knife edge 108 of a knife edge seal assembly 109. The knife edge 108 is disposed between adjacent rotor stages in the plurality of blade stages 101 and configured to interface with a vane assembly in the plurality of vane stages 105. In various embodiments, the knife edge seal assembly 109 is configured to seal air flow from core flow path C from FIG. 1A during operation of the gas turbine engine 20 from FIG. 1A.

Figure 2:
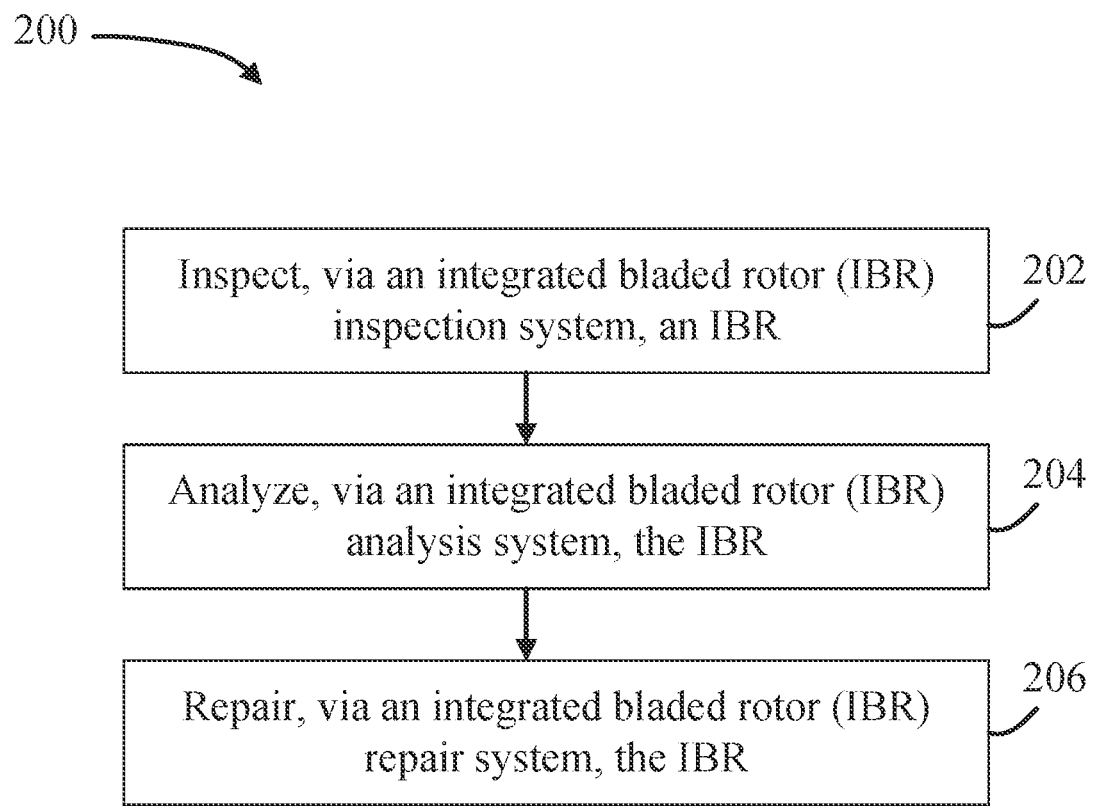
FIG. 2 illustrates a repair process for an integrally bladed rotor, in accordance with various embodiments.

Referring now to FIG. 2, a method 200 for repairing an IBR 100 from FIG. 1B from a compressor section (e.g., compressor section 24) of a gas turbine engine 20 from FIG. 1A is illustrated, in accordance with various embodiments. For example, after a predetermined number of flight cycles a gas turbine engine 20 from FIG. 1A is in operation, the method 200 may be performed for each IBR 100 in the compressor section 24 of the gas turbine engine 20. In various embodiments, method 200 may be performed for IBRs 100 from several gas turbine engines (e.g., in accordance with gas turbine engine 20), which may facilitate various potential repair options as described further herein.

The method 200 comprises inspecting, via an IBR inspection system, an IBR 100 (step 202). As described further herein, step 202 may be performed for numerous IBRs 100 prior to proceeding to step 204. In various embodiments, step 202 may be performed for a single IBR 100 prior to proceeding to step 204. The present disclosure is not limited in this regard.

In various embodiments, inspecting the IBR comprises scanning, via the IBR inspection system, the IBR 100. In this regard, the IBR inspection system may comprise an optical scanner (e.g., structured light scanners, such as white light scanners, structured blue light scanners, or the like) and/or a coordinate-measuring machine. The present disclosure is not limited in this regard. In response to scanning the IBR 100, a point cloud of the IBR 100 is received by a controller and converted to a three-dimensional model (e.g., a computer automated design (CAD) model). The three-dimensional model may be utilized for analyzing the IBR 100 in step 204 of method 200.

The method 200 further comprises analyzing, via an IBR analysis system, the IBR (step 204). In various embodiments, by inspecting a plurality of IBRs in step 202, a system level analysis of various repair options may be performed in step 204. For example, the three-dimensional model produced from step 202 may be used as an input for blade level analysis (e.g., low-cycle fatigue, high cycle fatigue, Goodman diagram analysis, frequency, modal assurance criterion, etc.), stage level analysis (e.g., mistuning, aerodynamic performance, fatigue, strength, residual stress, surface finish, imbalance, solidity, area and speed rotor sizing, etc.), and/or module level analysis (e.g., aerodynamic performance, compressor stack stiffness, clocking, clearances, blade counts, axial gapping, imbalance, secondary flow influence, etc.). In this regard, by generating a three-dimensional model via step 202 outlined above, various forms of analysis may be performed to generate an optimal repair configuration (e.g., optimized for aerodynamic performance, optimized for cost of repair, etc.). The optimal repair configuration may be for an airfoil of a respective IBR 100, for the respective IBR 100 as a whole, or for stack of IBRs 110 from FIG. 1B. The present disclosure is not limited in this regard.

The method 200 further comprises repairing, via an IBR repair system, the IBR (step 206). In various embodiments, a repair model may be generated from the analyzing step 204 of method 200. In various embodiments, a plurality of repair models may be generated based on various factors as outlined previously herein. In this regard, a repair process may be determined based on the analyzing step 204. In various embodiments, the repair performed in step 206 may be a partial repair. For example, in the analyzing step 204, optimal repair configurations for remaining life of the IBR 100 may be determined as well. For example, typical repairs are determined based on the IBR 100 meeting manufacturing tolerances/specifications and meeting full life (e.g., 25,000 flight cycles, 50,000 flight cycles or the like). If the IBR 100 is set for only 10,000 additional flight cycles of when the IBR 100 is originally designed for 50,000 flight cycles, the analysis in step 204 may account for that and provide a partial repair option that meets full life to accomplish a faster and/or cheaper repair.

Figure 3:
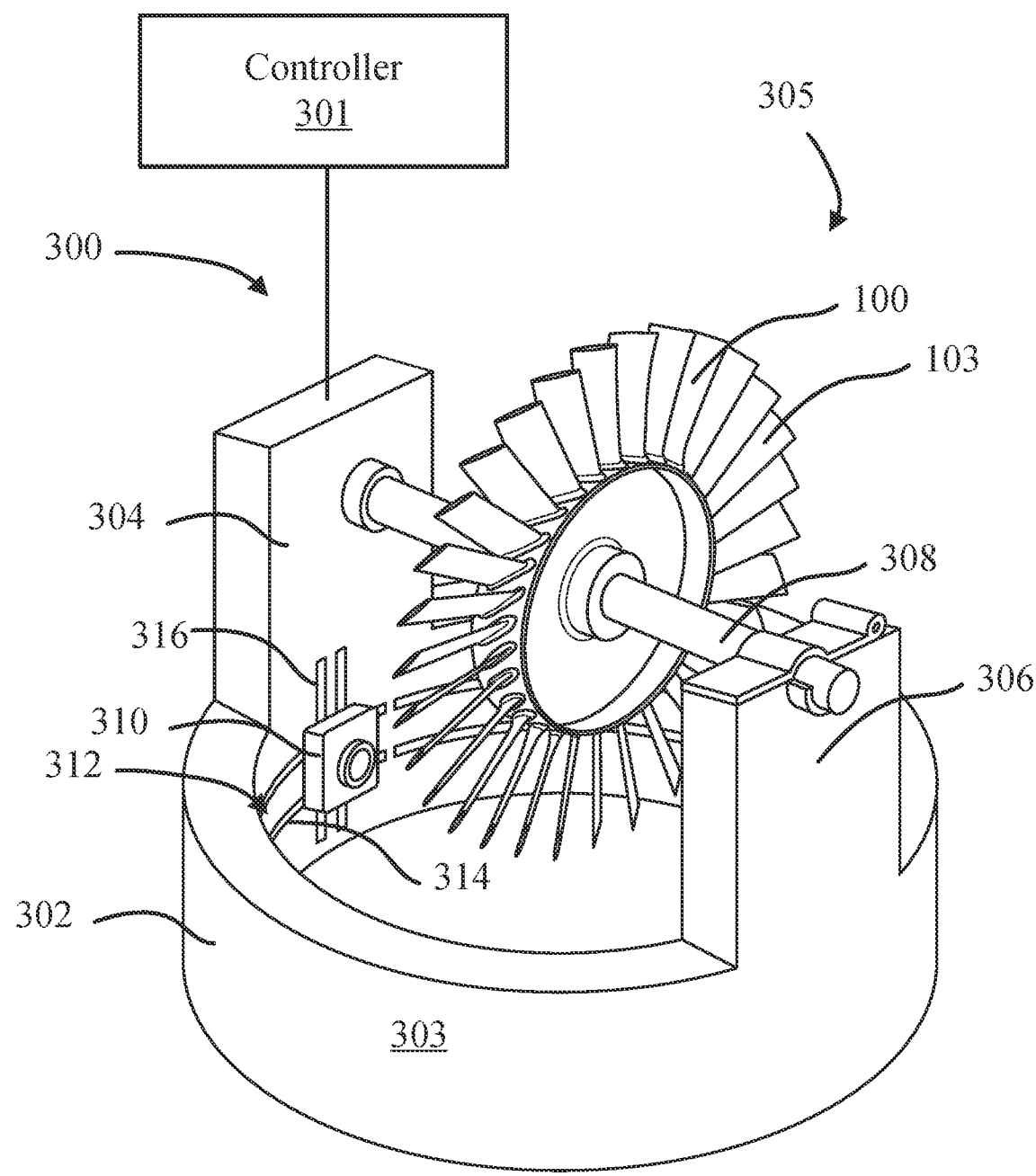
FIG. 3 illustrates a perspective view of a bladed rotor inspection system, in accordance with various embodiments.
Figure 4:
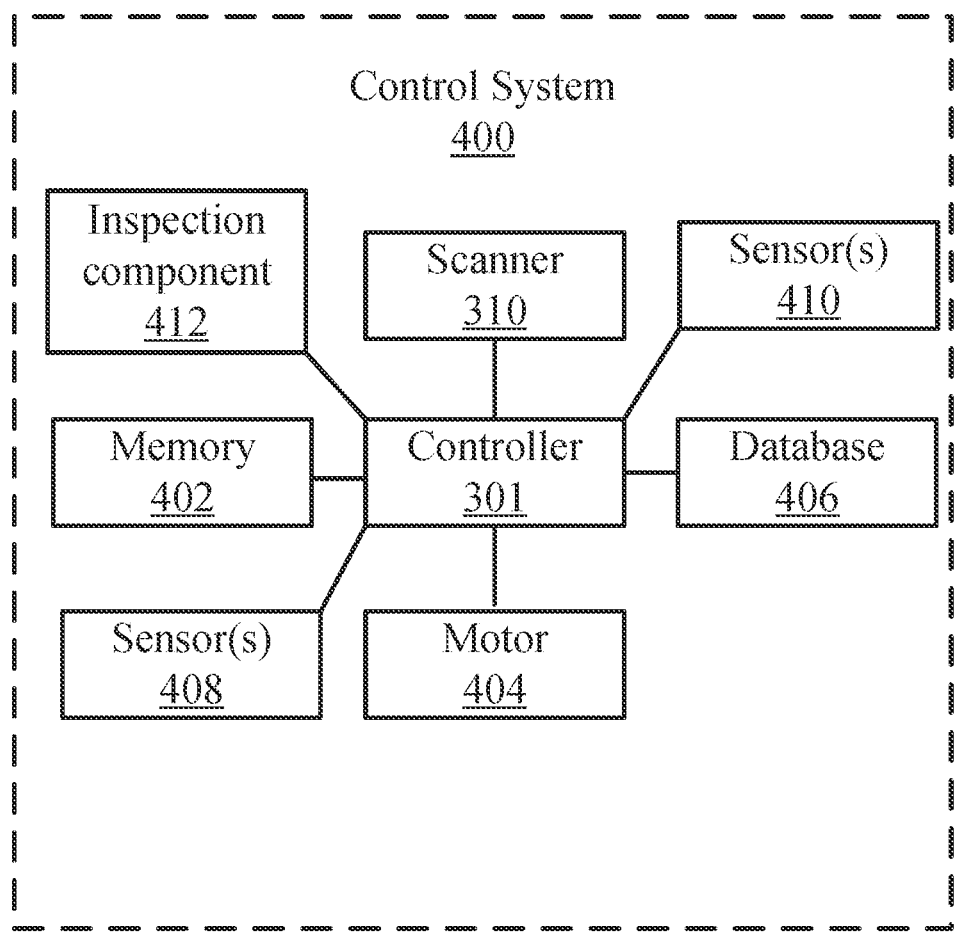
FIG. 4 illustrates a schematic view of a control system for a bladed rotor inspection system, in accordance with various embodiments.

Referring now to FIGS. 3 and 4, a perspective view of an inspection system 300 for use in an inspection step 202 of method 200 from FIG. 2 and a control system 400 for the inspection system 300 (FIG. 4) are illustrated in accordance with various embodiments. In various embodiments, the inspection system 300 comprises a controller 301, a support structure 302, a shaft 308, and a scanner 310. In various embodiments, the control system 400 comprises the controller 301, the scanner 310, a memory 402, a motor 404, a database 406, and sensor(s) 408, sensor(s) 410, and inspection component 412. In various embodiments, the inspection system 300 comprises a bladed rotor inspection device 305.

In various embodiments, the support structure 302 comprises a base 303, a first vertical support 304, a second vertical support 306. In various embodiments, the base 303 may be annular in shape. Although illustrated as being annular, the present disclosure is not limited in this regard. For example, the base 303 may be semi-annular in shape, a flat plate, or the like. In various embodiments, the vertical supports 304, 306 extend vertically upward from the base 303 on opposite sides of the base (e.g., 180 degrees apart, or opposite sides if the base 303 where a square plate). The shaft 308 extends from the first vertical support 304 to the second vertical support 306. The shaft 308 may be rotatably coupled to the motor 404, which may be disposed within the first vertical support 304, in accordance with various embodiments. The shaft 308 may be restrained vertically and horizontally at the second vertical support 306 but free to rotate relative to the second vertical support about a central longitudinal axis of the shaft 308. In various embodiments, a bearing assembly may be coupled to the second vertical support 306 to facilitate rotation of the shaft, in accordance with various embodiments.

In various embodiments, the IBR 100 to be inspected in accordance with the inspection step 202 of the method 200 via the inspection system 300 may be coupled to the shaft 308 (e.g., via a rigid coupling, or the like). The present disclosure is not limited in this regard, and the shaft 308 may be coupled to the IBR 100 to be inspected by any method known in the art and be within the scope of this disclosure.

In various embodiments, the scanner 310 is operably coupled to a track system 312. In various embodiments, the track system 312 may comprise a curved track 314 and a vertical track 316. The vertical track 316 may slidingly coupled to the vertical track 316 (e.g., via rollers or the like). The scanner 310 may be slidingly coupled to the vertical track 316 (e.g., via a conveyor belt, linkages or the like). In various embodiments, the scanner 310 is configured to extend from the track system 312 towards the IBR 100 during inspection of the IBR 100 in accordance with step 202 of method 200. In this regard, the inspection system 300 may further comprise a robot arm, an actuator or the like. Although described herein with tracks 314, 316, and a robot arm or actuator, the present disclosure is not limited in this regard. For example, any electronically controlled (e.g., wireless or wired) component configured to move the scanner 310 in six degrees of freedom relative to the IBR 100 is within the scope of this disclosure. In various embodiments, the inspection component 412 comprises rollers for the curved track, a conveyor belt for the vertical track, and/or a robotic arm coupled to the scanner 310. In various embodiments, the inspection component 412 comprises only a robotic arm. In various embodiments, the inspection component 412 comprises only the rollers for the curved track 314 and the conveyor belt or linkages for the vertical track 316. The present disclosure is not limited in this regard.

In various embodiments, the scanner 310 comprises a coordinate measuring machine (CMM) (e.g., a mechanical scanner, an optical scanner, a laser scanner, a white light scanner, or the like). In various embodiments, the scanner 310 is a blue light scanner. In various embodiments, the scanner 310 may be swapped with another scanner at any point during an inspection step 202 as described further herein. In various embodiments, the inspection system 300 may be configured to swap the scanner 310 with a different scanner during the inspection step 202 of method 200 as described further herein.

A "blue light scanner" as disclosed herein refers to a non-contact structure light scanner. The blue light scanner may have a scan range of between 100×75 mm$^2$-400×300 mm$^2$, in accordance with various embodiments. In various embodiments, an accuracy of the blue light scanner may be between 0.005 and 0.015 mm. In various embodiments, the blue light scanner be able to determine distances between adjacent points in the point cloud of between 0.04 and 0.16 mm as measured across three axes. In various embodiments, a volume accuracy of the blue light scanner may be approximately 0.8 mm/m. In various embodiments, a scan depth may be between approximately 100 and 400 mm. In various embodiments, the blue light scanner may comprise a light source including a blue LED. In this regard, the blue light scanner may be configured to emit an average wavelength between 400 and 450 nm, in accordance with various embodiments. Although described with various specifications herein, the blue light scanner is not limited in this regard, and one skilled in the art may recognize the parameters of the blue light scanner may extend outside the exemplary ranges. Use of a blue light scanner provides a high resolution point cloud for a three dimensional object.

The controller 301 may be integrated into computer system of the inspection system 300. In various embodiments, the controller 301 may be configured as a central network element or hub to various systems and components of the control system 400. In various embodiments, controller 301 may comprise a processor. In various embodiments, controller 301 may be implemented as a single controller (e.g., via a single processor and associated memory). In various embodiments, controller 301 may be implemented as multiple processors (e.g., a main processor and local processors for various components). The controller 301 can be a general purpose processor, a digital signal processor (DSP), an application specific integrated circuit (ASIC), a field programmable gate array (FPGA) or other programmable logic device, discrete gate or transistor logic, discrete hardware components, or any combination thereof. The controller 301 may comprise a processor configured to implement various logical operations in response to execution of instructions, for example, instructions stored on a non-transitory, tangible, computer-readable medium (e.g., memory 402) configured to communicate with the controller 301.

System program instructions and/or controller instructions may be loaded onto a non-transitory, tangible, computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the motor 404 of the control system 400 is operably coupled to the shaft 308 of the control system 400. In various embodiments, the motor 404 may comprise a direct current (DC) stepper, an alternating current (AC) motor or the like. The present disclosure is not limited in this regard. In various embodiments, the sensor(s) 408 include Hall effect sensor(s), optical sensor(s), resolver (s), or the like. In various embodiments, sensor(s) 408 may include sensor(s) configured to detect an angular position of the shaft 308 during an inspection step for an IBR 100 (e.g., step 202 from method 200). In this regard, during inspection of the IBR 100, the controller 301 receives sensor data from the sensor(s) 408. The controller 301 can utilize the sensor data received from the sensor(s) 408 to correlate an angular position of the IBR 100 being inspected with a location of the scanner 310 as described further herein.

In various embodiments, the sensor(s) 410 are configured to detect a position of the scanner 310 during the inspection step 202 of method 200. In this regard, sensor(s) 410 may be position sensors (e.g., capacitive displacement sensors, eddy-current sensors, Hall effect sensors, inductive sensors, optical sensors, linear variable differential transformer (LVDT) sensors, photodiode array sensors, piezoelectric sensors, encoders, potentiometer sensors, ultrasonic sensors or the like). The present disclosure is not limited in this regard. Thus, during inspection of the IBR 100 in accordance with step 202 of method 200, controller 301 is able to determine a location of the scanner 310 and an angular position of the IBR 100 throughout the inspection. Thus, based on the location of the scanner 310, an angular location of the IBR 100 and scanning data received from the scanner 310, a point cloud (e.g., a robust point cloud) can be generated during the inspection step 202 of method 200 for the IBR 100 being inspected. In various embodiments, the point cloud encompasses the entire IBR 100 (e.g., between 95% and 100% of a surface area of the IBR 100, or between 99% and 100% of the surface area of the IBR 100).

Figure 5:
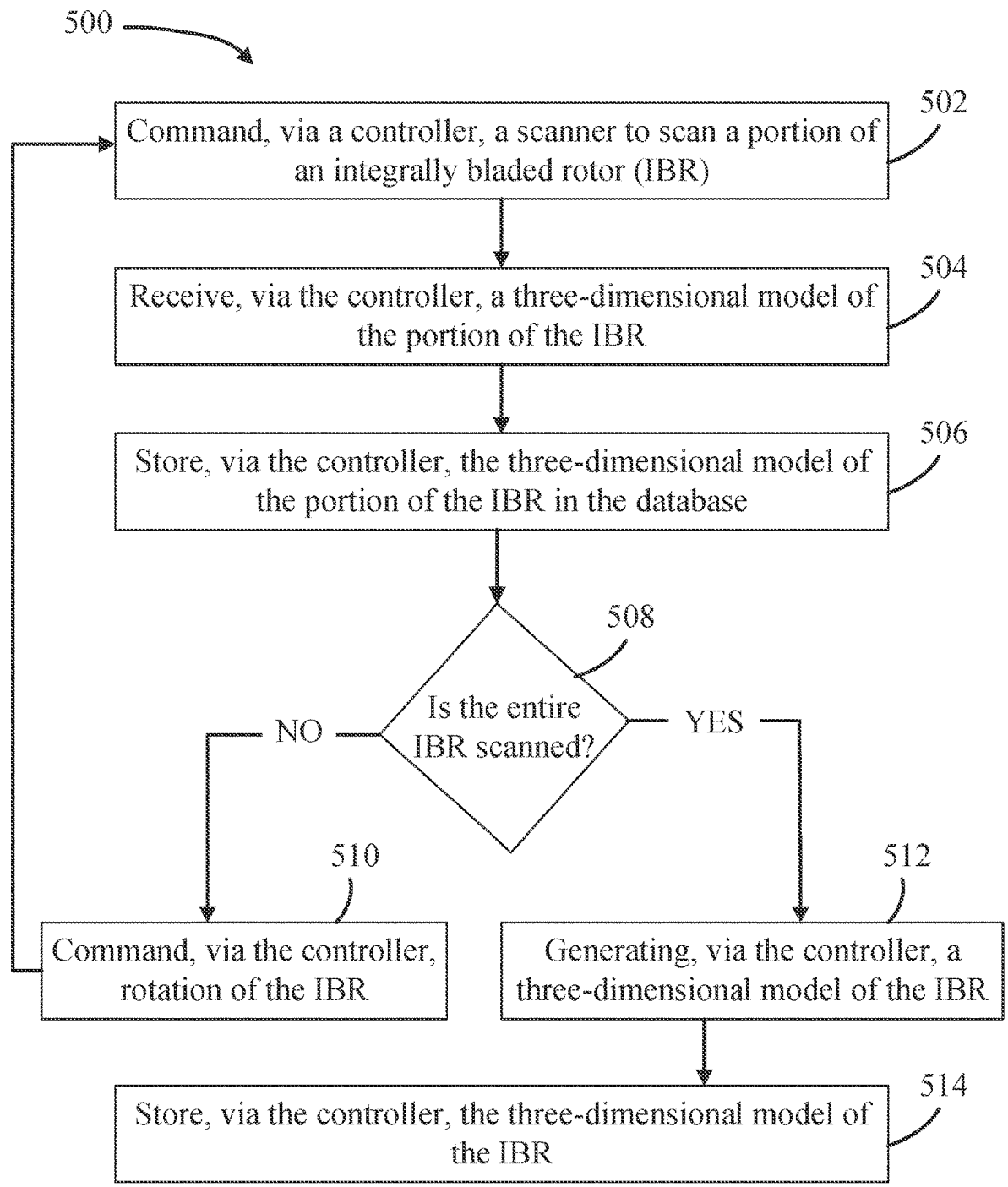
FIG. 5 illustrates a process performed by a control system for a bladed rotor inspection system, in accordance with various embodiments.

Referring now to FIG. 5, a process 500 for inspecting an IBR 100 that is performed by the control system 400 of the inspection system 300 is illustrated, in accordance with various embodiments. In various embodiments, the process 500 comprises commanding, via a controller 301, a scanner to scan a portion of the IBR 100 (step 502). In various embodiments, the portion of the IBR 100 may comprise a blade 103 or the like. In various embodiments, a root, a platform, or the like of the IBR 100 may be the portion. The present disclosure is not limited in this regard. In various embodiments, the root and the platform of the IBR 100 may be scanned along with the blade 103. In various embodiments, multiple blades 103 may be scanned with the portion of the IBR 100.

In various embodiments, commanding the scanner 310 in step 502 may further comprise commanding rollers of the curved track 314, commanding a conveyor belt or linkages of the vertical track 316 or the like in conjunction with scanning via the scanner 310. In this regard, the controller 301 may provide a predetermined path for the scanner 310 to scan the portion of the IBR 100, in accordance with various embodiments.

The process 500 further comprises receiving, via the controller, a three-dimensional model of the first portion of the IBR 100 (step 504). In various embodiments, the three-dimensional model is a point cloud. In this regard, in response to utilizing a CMM scanner or a blue light scanner, the scanner 310 measures discrete points of surfaces of the portion of the IBR being scanned and transmits the discrete points to the controller 301. In various embodiments, the point cloud may be relative to a datum defined by the inspection system 300. For example, the shaft 308 may be configured to couple to the IBR 100 being inspected in exactly the same place every time. In this regard, a datum for the inspection system 300 may be defined in the memory 402 of the control system 400. In various embodiments, the datum is a center point of the IBR 100 (e.g., a center point of the disk of the IBR 100). Thus, the controller 301 is configured to determine a location of each point scanned via the scanner 310 based on the datum, a location of the scanner 310 when a scan occurs during step 502 from sensor(s) 410, measurement data from the scanner 310, and an angular position of the IBR 100 from sensor(s) 408.

The process 500 further comprises storing, via the controller 301, the three dimensional model in a database 406 (step 506). Although described herein as intermittently storing scanned portions of the IBR 100, the present disclosure is not limited in this regard. For example, the scanner 310 may scan the entire IBR prior to transmitting the three-dimensional model to the controller 301 and still be within the scope of this disclosure. In this regard, the controller 301 may be configured to determine an amount of the IBR 100 that has been scanned based on the angular position of the IBR 100 and the position of the scanner 310 throughout step 502.

The process 500 further comprises determining whether the IBR has been scanned in its entirety (e.g., between 95% and 100% or between 99% and 100% or approximately 100%). In this regard, the process 500 may determine whether the scanner 310 has performed a scan at each predetermined arc angle (e.g., 1 degree, 3 degrees, 5 degrees, or the like) and a total angular rotation of the IBR 100 for the scanning process has reached 360 degrees.

If the entire IBR has not been scanned, the process 500 further comprises commanding, via the controller 301, rotation of the IBR 100 a fixed amount (e.g., 1 degree, 3 degrees, 5 degrees, 10 degrees, etc.) (step 510). The present disclosure is not limited in this regard. The controller 301 may command the motor 404 to rotate the IBR 100 the fixed amount, in accordance with various embodiments.

In various embodiments, steps 502, 504, 506, 508 are repeated until the entire IBR is scanned according to step 508, at which point the process 500 further comprises generating, via the controller 301, a three-dimensional model of the IBR 100 (step 512). In this regard, in response to the scanner 310 being a CMM scanner or a blue light scanner, the controller 301 may stitch together the point clouds for each portion of the IBR scanned via step 502 to generate a robust point cloud of the entire IBR 100 (e.g., between 95% and 100% of an external surface area of the IBR 100, or between 99% and 100% of the external surface area of the IBR 100, or approximately 100% of the external surface area of the IBR 100). In various embodiments, the entire IBR 100 refers to approximately 100% of an external surface area of all the blades of the IBR 100.

In various embodiments, the process 500 further comprises storing, via the controller 301, the three-dimensional model of the MR in the database 406 (step 514). In this regard, the three dimensional model may be utilized for analyzing the inspected IBR (e.g., in accordance with step 204 of method 200), determining a repair for the inspected IBR (e.g., based on step 204 of method 200) and/or in repairing the inspected IBR (e.g., in accordance with step 206 of method 200).

In various embodiments, the process 500 may provide a fully automated solution for generating a robust three dimensional model (e.g., a point cloud) for an inspected IBR 100, in accordance with various embodiments.

Figure 6:
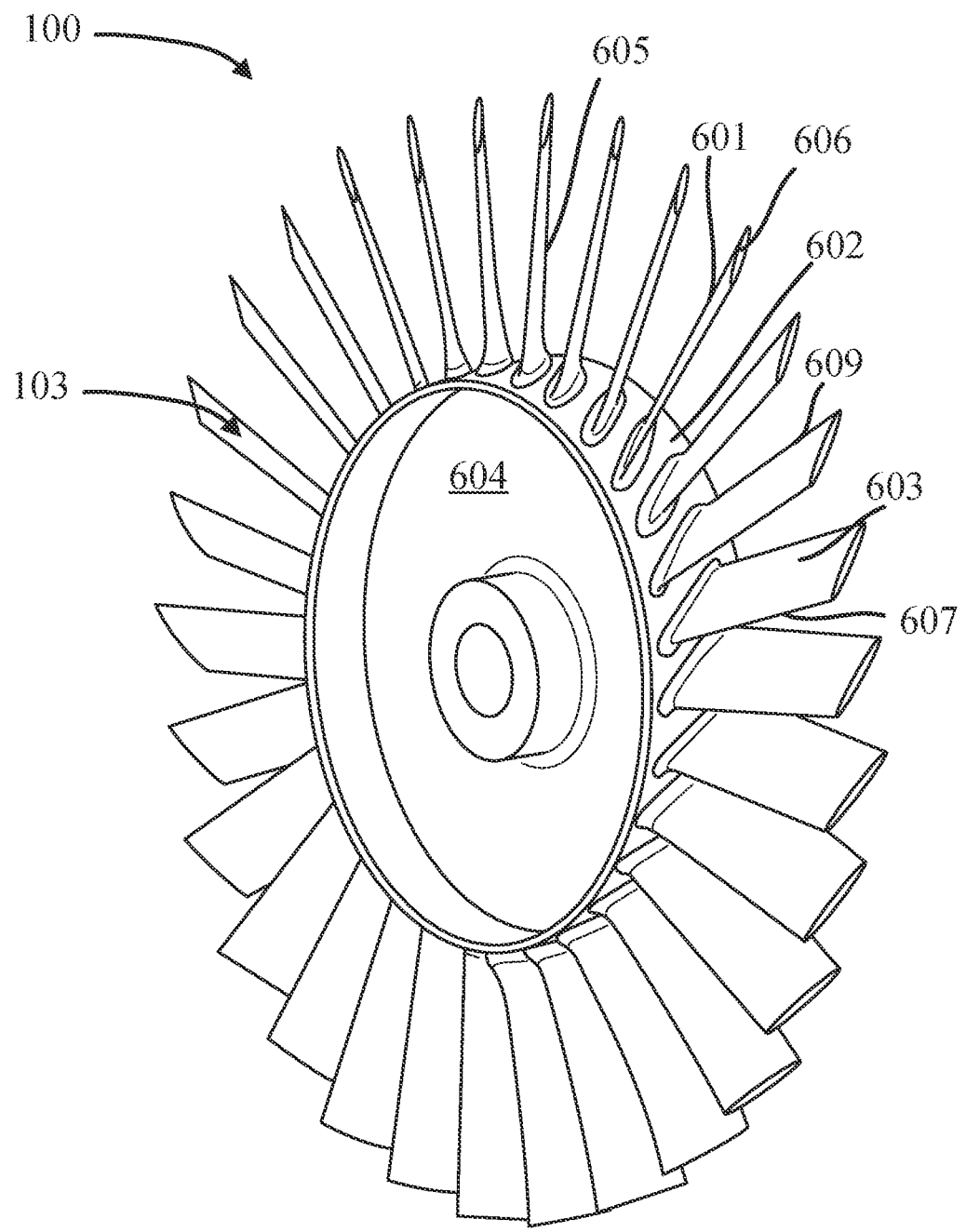
FIG. 6 illustrates a perspective view of a bladed rotor for inspection, in accordance with various embodiments.

Referring now to FIG. 6, a perspective view of an IBR 100 for inspecting in accordance with the process 500 is illustrated, in accordance with various embodiments. The IBR 100 comprises a plurality of the blades 103 disposed circumferentially around a platform 602 of the IBR 100. The platform 602 may define a radially outer end of a disk 604 of the IBR 100. Each blade 103 in the plurality of the blades 103 extends radially outward from the platform 602 from a proximal end at the platform 602 to a distal end 606 (e.g., a tip of the blade 103)

Figure 7:
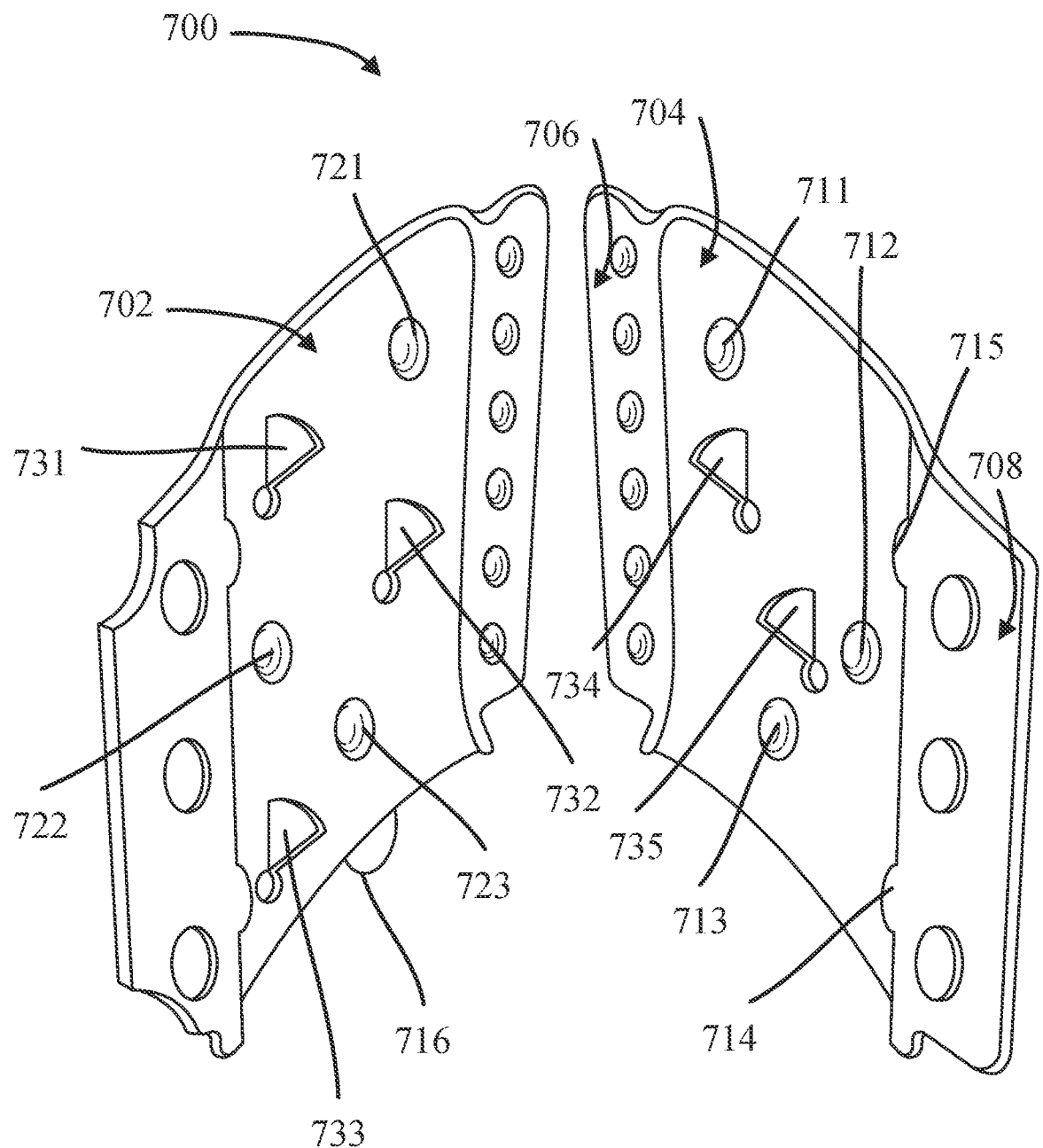
FIG. 7 illustrates a sheath for use in a bladed rotor inspection system, in accordance with various embodiments.

In various embodiments, the blade 103 comprise an airfoil 601. In various embodiments, blade and airfoil may be used interchangeably herein and still be within the scope of this disclosure. The airfoil 601 comprises a pressure side 603, a suction side 605, a leading edge 607 and a trailing edge 609. As described further herein, a six-point nest may be determined via a sheath 700 as shown in FIG. 7 by generating six contact points (e.g., with the platform 602, one of the leading edge 607 and the trailing edge 609, and one of the pressure side 603 and the suction side 605 of the airfoil) as described further herein. In various embodiments, the six-point nest of each airfoil 601 may be determined based on an inspection process as described further herein. In this regard, the inspection process may be configured to generate a second six point nest based on a plurality of locators. In this regard, based on the second six point nest, the inspection system may determine the first six point nest (e.g., within a certain tolerance), and then determine a datum associated with the first six point nest. In this regard, each airfoil 601 may be compared based on a consistent six-point nest with a consistent datum regardless of which inspected IBR the airfoil 601 is on, or which airfoil 601 the airfoil is in the plurality of blades 103 of the inspected IBR 100.

Referring now to FIG. 7, a sheath 700 for use in the process 500 and the processes described further herein, is illustrated, in accordance with various embodiments. In various embodiments, the sheath 700 comprises a clamshell (e.g., a first half 702 and a second half 704). Although illustrates as comprising a clamshell configuration, the present disclosure is not limited in this regard. For example, the sheath 700 may be formed of a single-piece (e.g., a monolithic component), and be configured to slide over a blade 103 of an airfoil 601, in accordance with various embodiments.

In various embodiments, the halves 702, 704 of the clamshell are configured to be hingedly coupled proximate a trailing edge 609 of an airfoil 601 of an IBR 100. In this regard the first half 702 and the second half 704 of the clamshell may be wrapped around the airfoil 601 from the trailing edge 609, the first half 702 and the second half 704 may be pivoted together about a hinge of the clamshell (e.g., disposed at a trailing edge or leading edge of the clamshell). However, the present disclosure is not limited in this regard. For example, both a trailing edge end and a leading edge end of the first half 702 may be configured to be coupled to the trailing edge end 706 and the leading edge end 708 of the second half, in accordance with various embodiments.

In various embodiments, the sheath 700 defines a six-point nest for a respective blade 103 of an IBR. For example, the sheath 700 comprises a first protrusion 711, a second protrusion 712, a third protrusion 713, a first edge roll 714, a second edge roll, 715 and a fourth protrusion 716. The protrusions 711, 712, and 713 may each be configured to contact one of the pressure side 603 or the suction side 605 of the airfoil. In this regard, contact points for the protrusions 711, 712, 713 may define a plane of the six point nest for the respective blade 103, in accordance with various embodiments.

In various embodiments, the edge rolls 714, 715 are configured to contact a leading edge 607 of the airfoil. Although discussed herein as contacting the leading edge 607 of the airfoil 601, the present disclosure is not limited in this regard. For example, the edge rolls 714, 715 may be configured to contact the trailing edge 609 of the airfoil 601, a distal end 610 (e.g., a tip) of the airfoil, or the like and still be within the scope of this disclosure. In this regard, contact points for the edge rolls 714, 715 of the sheath define a line of the six-point nest for the respective blade 101 of the IBR 100 being inspected.

In various embodiments, the fourth protrusion 716 is configured to contact the platform 602 of the IBR 100. In this regard, the sixth point of the six-point next may be the contact point between the fourth protrusion 716 and the platform 602. In various embodiments, by identifying the six contact points via the sheath 700, an origin of the IBR 100 may be determined. The origin may correspond to an origin of a blue print (e.g., a product definition) associated with the IBR 100. In this regard, the six-point nest constrains the airfoil 601 in space in a consistent manner to facilitate consistent comparison between airfoils for an IBR 100 being inspected and/or across a stack of IBRs 110 in a compressor section 24 of a gas turbine engine, in accordance with various embodiments.

In various embodiments, the sheath 700 further comprises protrusions 721, 722, 723. The protrusions 721, 722, 723 are configured to interface with an airfoil surface opposite the protrusions 711, 712, 723. In this regard, the protrusions 721, 722, 723 are configured to ensure the protrusions 711, 712, 713 contact the airfoil surface (e.g., a pressure side 603 surface, a suction side 605 surface or the like) by compressing the protrusions 711, 712, 713 against the respective surface in response to coupling the first half 702 to the second half 704. In various embodiments, in response to the protrusions 711, 712, 713 being configured to interface with a suction side 605 of the airfoil 601, the protrusions 721, 722, 723 are configured to interface with the pressure side 603 of the airfoil. Similarly, in response to the protrusions 711, 712, 713 being configured to interface with a pressure side 603 of the airfoil 601, the protrusions 721, 722, 723 are configured to interface with the suction side 605 of the airfoil 601.

In various embodiments, the sheath 700 further comprises aperture 731, 732, 733, 734, 735. In various embodiments, three of the apertures (e.g., apertures 731, 732, 733) are disposed on a first half 702 and two of the apertures (e.g., apertures 734, 735) are disposed on a second half 704 of the sheath 700. In various embodiments, apertures 731, 732, 733 are configured to provide access through the sheath 700 to one of a pressure side 603 or a suction side 605 of an airfoil 601 in response to the sheath 700 being coupled to the airfoil. Similarly, the apertures 734, 735 are configured to provide access through the sheath 700 to one of the pressure side 603 or the suction side 605 of the airfoil (i.e., an opposite side relative to apertures 731, 732, 733).

In various embodiments, the apertures 731, 732, 733, 734, 735 are configured to facilitate efficient and accurate placement of a locator as described further herein.

Figure 8A:
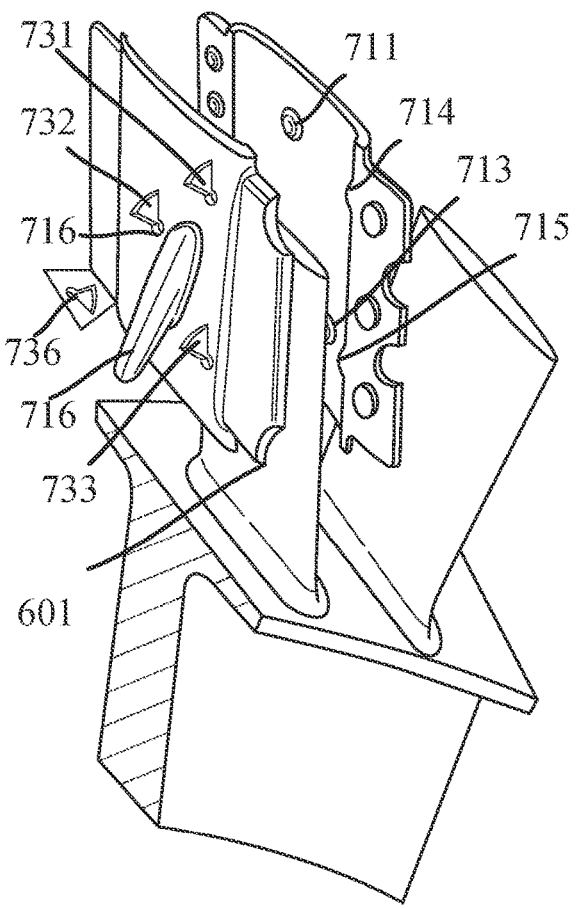
FIG. 8A illustrates a sheath being coupled to an airfoil, in accordance with various embodiments.
Figure 8B:
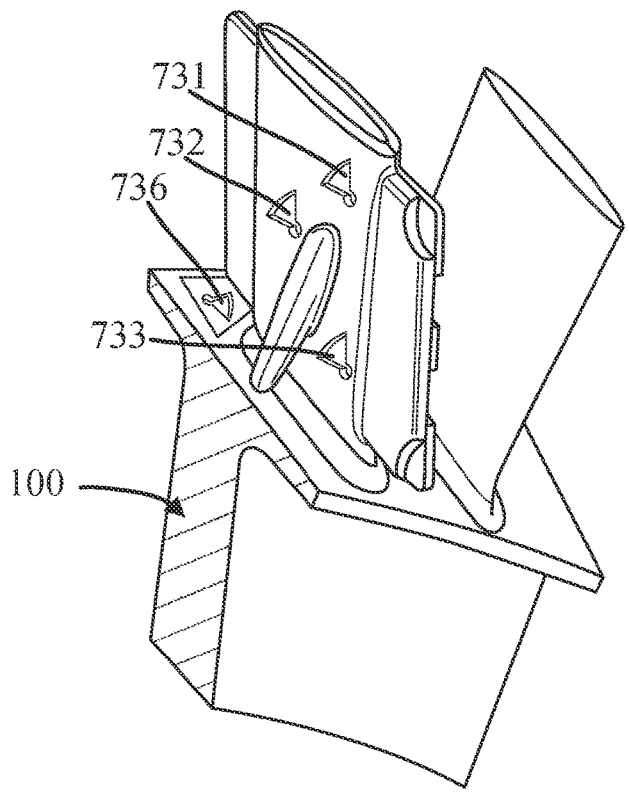
FIG. 8B illustrates a sheath coupled to an airfoil, in accordance with various embodiments.

Referring now to FIGS. 8A and 8B, perspective cut-away view of a sheath 700 being assembled (FIG. 8A) and coupled to an airfoil 601 (FIG. 8B) is illustrated, with like numerals depicting like elements, in accordance with various embodiments prior to an inspection step 202 of method 200. In various embodiments, the sheath 700 further comprises an aperture 736 configured to provide access to the platform 602 of the IBR 100. In this regard, as described further herein, six locators may be aligned, and coupled to, the IBR 100 based on the apertures 731, 732, 733, 734, 735, 736 for each airfoil 601 of a respective IBR 100. In this regard, a sheath 700 may be coupled to a airfoil 601, locators may be aligned and coupled to the first airfoil, the sheath 700 may be de-coupled from the airfoil 601, and the process may be repeated until each airfoil has six locators associated with the airfoil 601 to define a position of the airfoil relative to a consistent origin as described further herein, in accordance with various embodiments.

Figure 9A:
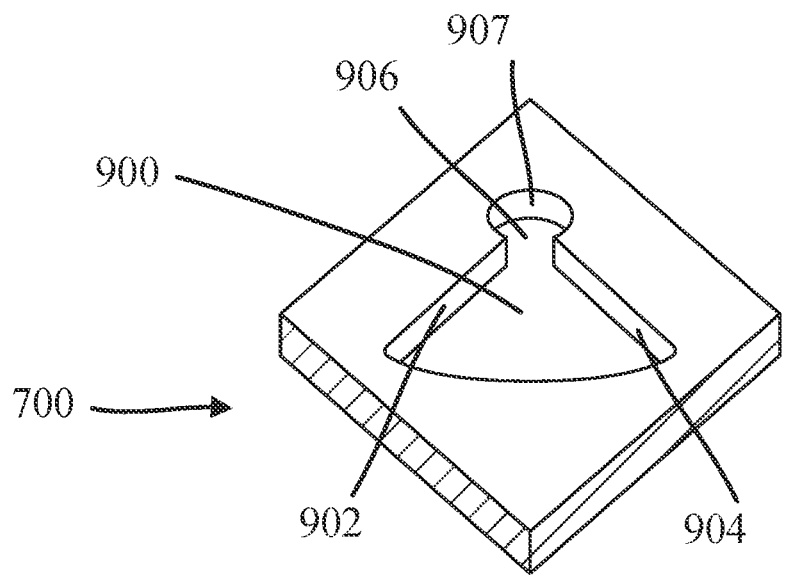
FIG. 9A illustrates an aperture of a sheath in accordance with various embodiments.

Referring now to FIG. 9A, a detail view of an aperture 900 of a sheath 700 for aligning and coupling locators to an IBR 100 is illustrated in accordance with various embodiments. In various embodiments, the apertures 731, 732, 733, 734, 735, 736 are in accordance with the aperture 900. In various embodiments, the aperture 900 comprises a keyhole shape. In this regard, the aperture may comprise a first side 902 and a second side 904 converging into a non-fully circular aperture 906. The non-fully circular aperture 906 may define an arcuate side 907.

Figure 9B:
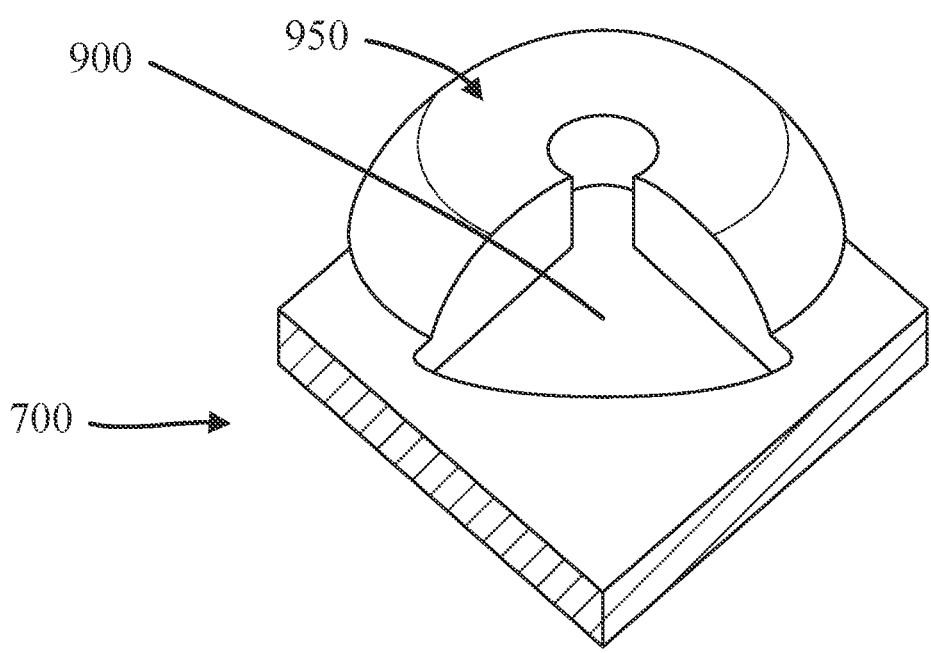
FIG. 9B illustrates an aperture of a sheath in accordance with various embodiments.

Referring now to FIG. 9B, in various embodiments, the aperture 900 is disposed through an alignment protrusion 950. In this regard, each aperture in the apertures 731, 732, 733, 734, 735 736 may be disposed through the alignment protrusion 950. The alignment protrusion 950 may extend outward (e.g., away from a surface having a locator coupled there to). The alignment protrusion 950 may provide additional surface area for the locator to contact in response to aligning and coupling the locator to a surface of an IBR 100 as described further herein. In this regard, the alignment protrusion 950 may facilitate more consistent placement of the locator as described further herein.

Figure 10:
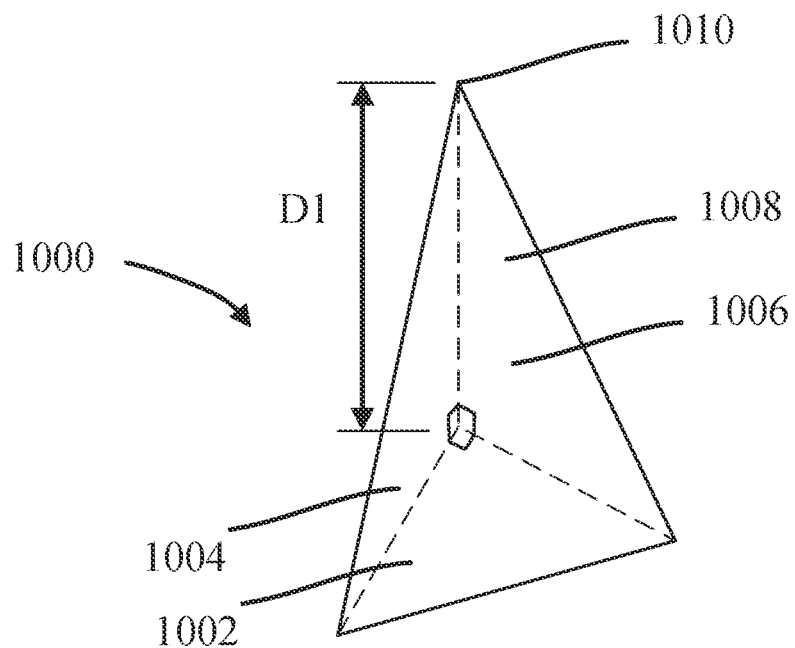
FIG. 10 illustrates a locator for use in generating a six-point nest of an airfoil, in accordance with various embodiments.

Referring now to FIG. 10, a locator 1000 for use in generating a six-point nest for a respective airfoil 601 is illustrated, in accordance with various embodiments. The locator 1000 may comprise a right triangular pyramid, in accordance with various embodiments. Although illustrated as a right triangular pyramid, the present disclosure is not limited in this regard. For example, a triangular pyramid, square pyramid, a pentagonal pyramid, a rectangular pyramid or the like are all within the scope of this disclosure. In various embodiments a right triangular pyramid may facilitate accurate and consistent placement of the locator 1000 within the apertures 731, 732, 733, 734, 735, 736 of the sheath 700, in accordance with various embodiments.

In various embodiments, the locator comprises a base 1002, a first side 1004, a second side 1006, a third side 1008, and a apex 1010. In various embodiments, the base 1002 is configured to be coupled to the IBR 100 as described further herein (e.g., via an adhesive or the like). In various embodiments, the first side 1004 and the second side 1006 are perpendicular to a plane defined by the base 1002. However, the present disclosure is not limited in this regard. In various embodiments, the third side 1008 forms an acute angle with a plane defined by the base 1002. The first side 1004, the second side 1006, and the third side 1008 intersect at the apex 1010. The apex 1010 is designed to be a predetermined distance D1 from the base. Thus, in response to determine a location of the apex 1010 in space, a location of a surface the locator 1000 is coupled that intersects with the base 1002, the first side 1004, and the second side 1006 may be determined.

Figure 11:
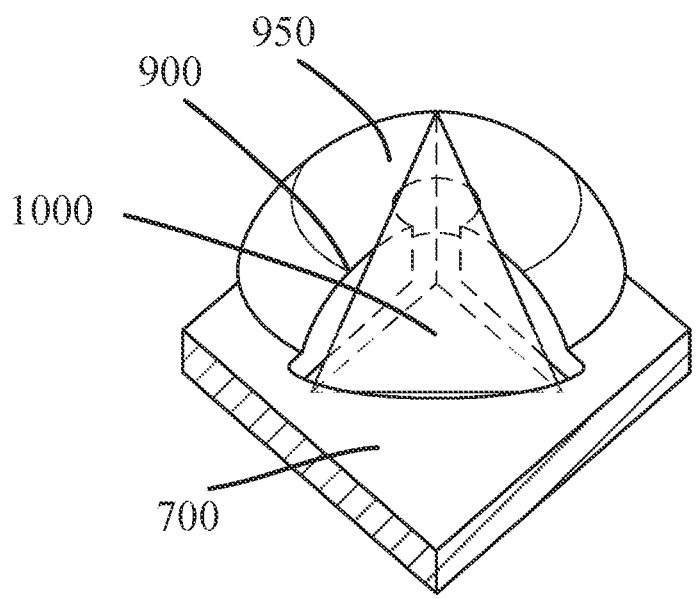
FIG. 11 illustrates aligning a locator on an airfoil through a sheath, in accordance with various embodiments.

With reference now to FIG. 11, the locator 1000 may be coupled to an IBR 100 set to be inspected in accordance with step 202 of method 200 through the aperture 900 (e.g., for each aperture in the apertures 731, 732, 733, 734, 735, 736 of the sheath 700), in accordance with various embodiments. In various embodiments, the locator 1000 may be further aligned via the alignment protrusion 950. In various embodiments, the aperture 900 may facilitate alignment of the apex 1010 of the locator 1000 approximately with a centerline of the non-fully circular aperture 906. In this regard, the locator 1000 may consistently be disposed accurately and efficiently on the IBR 100.

Figure 12:
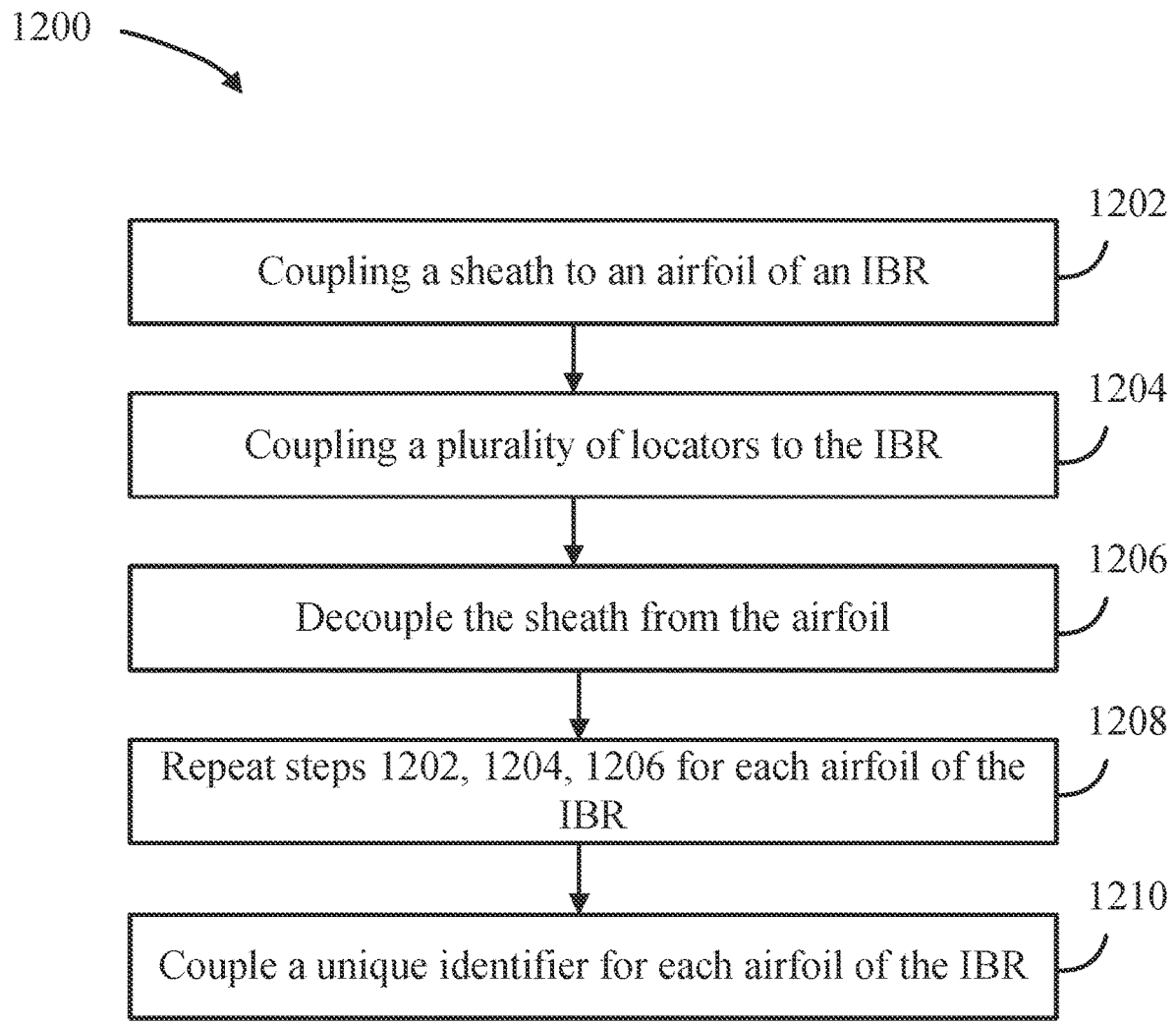
FIG. 12 illustrates a method of preparing a bladed rotor for inspection.

Referring now to FIG. 12, a method 1200 of preparing a IBR 100 for inspection is illustrated, in accordance with various embodiments. The method 1200 comprises coupling a sheath 700 to an airfoil 601 of an IBR 100 (step 1202) and coupling a plurality of locators 1000 to the IBR 100. In various embodiments, the plurality of locators 1000 may include six locators. Although described herein as comprising six locators, the present disclosure is not limited in this regard. For example, three locators may be utilized to form an over constrained six point nest (e.g., one point is part of a plane, a line, and a point of the six-point nest, a second point is a part of the plane and the line, and a third point is a part of the plane). Thus, at least three locators may be desirable for forming a six-point nest to define a location of the airfoil 601 in space as defined further herein. In various embodiments, by using six locators 1000 a more robust and accurate location of the airfoil 601 may be determined, in accordance with various embodiments.

In various embodiments, coupling the plurality of locators in step 1204 may include adhering a base 1002 of each locator 1000 to an external surface of the IBR 100 (e.g., a pressure side 603 surface, a suction side 605 surface, a platform 602 surface, or the like). The base may be aligned on the respective external surface of the IBR 100 via an aperture 900 disposed through the sheath 700. In various embodiments, the aperture 900 may be keyhole shaped as described further herein. In various embodiments, an alignment protrusion 950 may further facilitate accurate placement of the locator 1000, in accordance with various embodiments.

The method 1200 may further comprise de-coupling the sheath from the airfoil (step 1206) and repeating steps 1202, 1204, 1206 for each airfoil 601 of the IBR 100 (step 1208).

In this regard, after completing method 1200, each airfoil may be associated with six locators.

In various embodiments, the method 1200 further comprises coupling a unique identifier to each airfoil of the IBR 100 (step 1210). In this regard, a first airfoil may determine a first clocked position (e.g., 0 degrees), and each airfoil may be clocked relative to the first airfoil. In this regard, the IBR analysis system from step 204 of method 200 may factor in repair shapes of one airfoil and its effect on other airfoils, of the same IBR or other IBRs in a stack of inspected IBRs, in accordance with various embodiments. In various embodiments, during inspection of the IBR in accordance with step 202 of method 200 after having the unique identifiers disposed thereon, a top dead center of the IBR may be delineated based on the unique identifiers, which may provide an additional reference point for comparison purposes in an analysis step 204 of method 200.

In various embodiments, by facilitating a consistent six-point nest for each airfoil, all airfoils that have been inspected and repaired and stored in the database 406 may be accessible for comparison purposes in the analysis step 204 of method 200 for determining a respective repair for the IBR 100.

Figure 13:
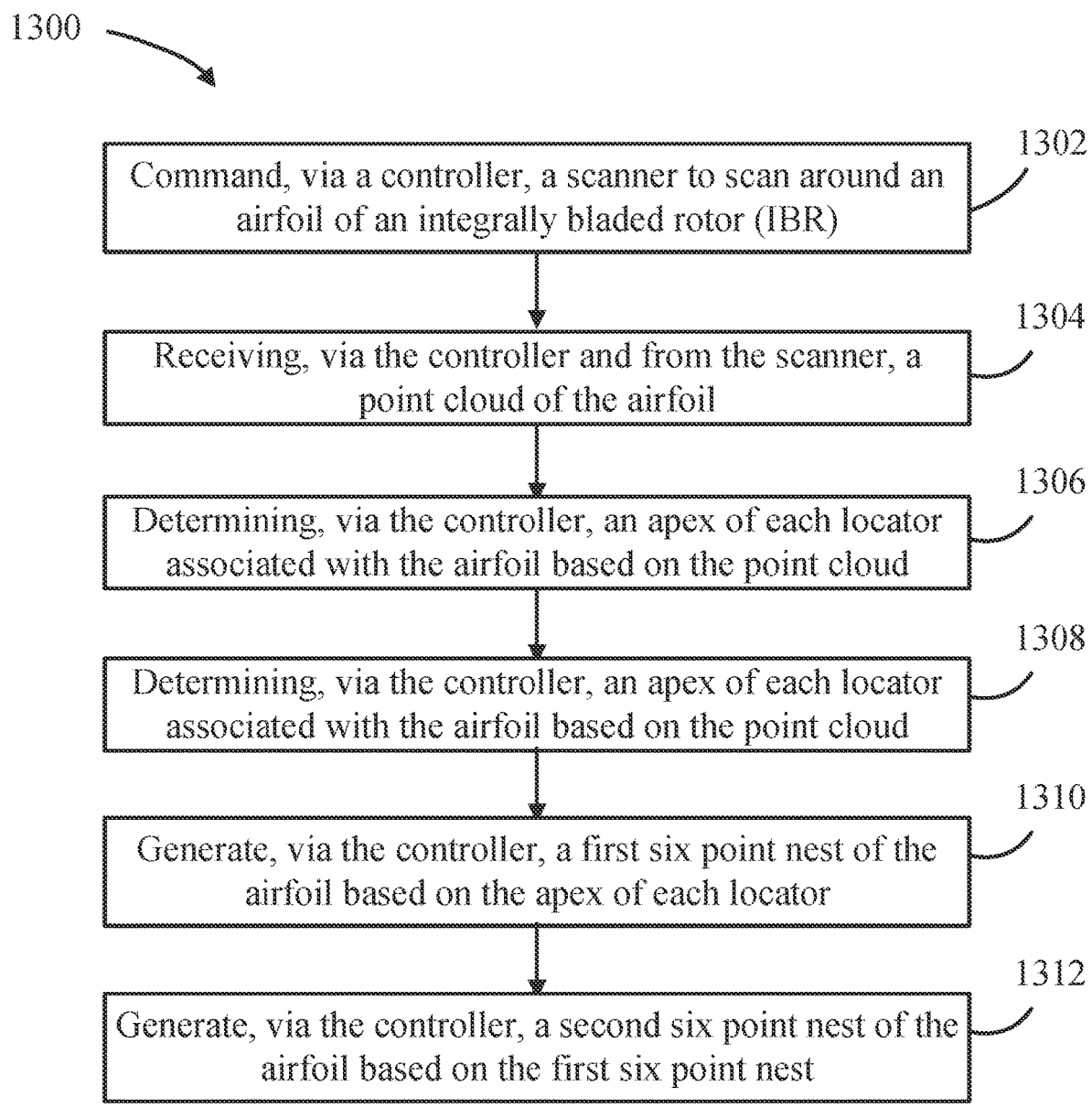
FIG. 13 illustrates a process performed by a bladed rotor inspection system, in accordance with various embodiments.

Referring now to FIG. 13, a process 1300 for generating a six point nest of an airfoil of an inspected IBR 100 via the inspection system 300, is illustrated, in accordance with various embodiments. The process 1300 comprises commanding, via a controller 301, a scanner 310 to scan an airfoil of an IBR 100 after locators were disposed thereon in accordance with method 1200 (step 1302).

The process 1300 further comprises receiving, via the controller 301 and from the scanner 310, a point cloud of the airfoil 601 (step 1304). In this regard, the scanner 310 may comprise a CMM scanner or a blue light scanner. In various embodiments, the scanner 310 comprises a blue light scanner.

The process 1300 further comprises determining, via the controller 301, an apex 1010 of each locator 1000 associated with the airfoil 601 based on the point cloud (step 1306). In this regard, the scanner 310 may receive discrete points in the point cloud of each side surface of the locator 1000 (e.g., sides 1004, 1006, 1008). Thus, the controller can determine, based on at least three discrete points on each side (or averaging any number of points on each side), a plane for each side. The controller can further determine an intersection of each plane for each side (e.g., sides 1004, 1006, 1008), which is the apex 1010. As such, the controller 301 can determine the apex of each locator 1000 (step 1308). In response to having at least three locators 1000 and up to six locators 1000 associated with the airfoil 601, the controller 301 can generate a first six point nest of the airfoil 601 based on the apex of each locator (step 1310).

In various embodiments, the process 1300 further comprises generating, via the controller 301, a second six point nest of the airfoil 601 based on the first six point nest (step 1312). In various embodiments, by generating the first six point nest of the airfoil in step 1310, a reference frame of the airfoil 601 may be unambiguously defined. In this regard, the reference frame of the airfoil 601 based on the locator has a distinct spatial relation to the six-point nest defined by the protrusions 711, 712, 713, 716 and edge rolls 714, 715 of the sheath 700. In various embodiments, the six point nest of the protrusions 711, 712, 713, 716 and edge rolls 714, 715 of the sheath 700 may be constrained relative to an origin corresponding an origin of a design for the IBR being inspected. In this regard, the six point nest defined by the protrusions 711, 712, 713, 716 and edge rolls 714, 715 of the sheath 700 may correspond to an origin which defines a product definition for the IBR being inspected. In this regard, by generating the second six point nest based on the first six point next, the IBR analysis system may overlay airfoil based on the second six point nest and have a direct comparison of variations between airfoils. In this regard, potential repairs may be compared, repairs effects on vibratory characteristics may be compared, past repairs effects on vibratory characteristics may be compared, airfoils of the same inspected IBR may be compared, or the like. The present disclosure is not limited in this regard.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An article of manufacture including a tangible, non-transitory computer-readable storage medium having instructions stored thereon that, in response to execution by one or more processors, cause the one or more processors to perform operations comprising:
   commanding, by the one or more processors, a scanner to scan around a first airfoil of a bladed rotor;
   determining, by the one or more processors, an apex of each of a plurality of locators associated with the first airfoil;
   electronically generating, by the one or more processors, a first six point nest of the first airfoil based on the apex of each of the plurality of locators; and
   electronically generating, by the one or more processors, a second six point nest of the first airfoil based on the first six point nest;
   commanding, by the one or more processors, a motor to rotate a shaft coupled to the bladed rotor a fixed amount;
   commanding, by the one or more processors, the scanner to scan a second airfoil of the bladed rotor;
   determining, by the one or more processors, a second apex of each of a second plurality of locators associated with the second airfoil; and
   generating, by the one or more processors, a first six point nest of the second airfoil based on the second apex of each locator in the second plurality of locators.

2. The article of manufacture of claim 1, wherein the second six point nest includes an origin corresponding to second origin of a product definition for a design of the bladed rotor being inspected.

3. The article of manufacture of claim 1, wherein the plurality of locators includes at least three locators.

4. The article of manufacture of claim 1, wherein the operations further comprise generating, by the one or more processors, a second six point nest of the second airfoil based on the second apex of each of the second plurality of locators, the second six point nest of the second airfoil defining a second origin corresponding to a first origin of the second six point nest of the first airfoil.

5. A method for generating at least two six point nests for an airfoil of a bladed rotor, the method comprising:
commanding, by one or more processors, a scanner to scan around a first airfoil of the bladed rotor;
determining, by the one or more processors, an apex of each of a plurality of locators associated with the first airfoil;
electronically generating, by the one or more processors, a first six point nest of the airfoil based on the apex of each of the plurality of locators;
electronically generating, by the one or more processors, a second six point nest of the airfoil based on the first six point nest;
coupling a sheath to the airfoil of the bladed rotor, the sheath comprising a plurality of apertures disposed therein; and
coupling the plurality of locators to the bladed rotor, each of the plurality of locators disposed through a corresponding aperture in the plurality of apertures,
wherein each of the plurality of locators includes a pyramid shape.

6. The method of claim 5, further comprising decoupling the sheath from the airfoil.

7. The method of claim 6, further comprising:
recoupling the sheath to a second airfoil; and
coupling a second plurality of locators to the second airfoil, each of the second plurality of locators disposed through the corresponding aperture in the plurality of apertures.

8. The method of claim 7, further comprising coupling a third plurality of locators to each of a plurality of airfoils from the bladed rotor through the plurality of apertures of the sheath.

9. The method of claim 5, wherein the plurality of locators include at least three locators.

10. The method of claim 5, wherein each of the plurality of locators is aligned and placed via the corresponding aperture in the plurality of apertures.

11. The method of claim 5, wherein three locators in the plurality of locators are coupled to one of a pressure side and a suction side of the airfoil.

12. The method of claim 11, wherein two of the plurality of locators are coupled to an opposite side of the airfoil from the three locators.

13. The method of claim 12, wherein a sixth locator is coupled to a platform of the bladed rotor.

* * * * *